(12) United States Patent
Xiang

(10) Patent No.: US 10,237,346 B2
(45) Date of Patent: Mar. 19, 2019

(54) MAINTAINING PARTITION-TOLERANT DISTRIBUTED METADATA

(71) Applicant: VMware, Inc., Palo Alto, CA (US)

(72) Inventor: Enning Xiang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 221 days.

(21) Appl. No.: 15/427,778

(22) Filed: Feb. 8, 2017

(65) Prior Publication Data

US 2018/0227363 A1 Aug. 9, 2018

(51) Int. Cl.
*H04L 29/08* (2006.01)
*H04L 12/24* (2006.01)

(52) U.S. Cl.
CPC .......... *H04L 67/1095* (2013.01); *H04L 41/12* (2013.01); *H04L 67/1097* (2013.01)

(58) Field of Classification Search
CPC ......... H04L 51/04; H04L 51/34; H04L 51/20; H04L 51/10; H04L 67/22; H04L 67/1095; H04L 41/12; H04L 67/1097; H04N 21/84; H04N 21/472; H04N 21/4532; H04N 21/44222; H04N 21/482; G06F 13/00
See application file for complete search history.

(56) References Cited

U.S. PATENT DOCUMENTS

| | | | | |
|---|---|---|---|---|
| 6,965,957 B1* | 11/2005 | Nguyen | ................ | G06F 9/5061 710/100 |
| 8,805,978 B1* | 8/2014 | Anthonisamy | ........ | G06F 9/5072 709/208 |
| 8,862,642 B1* | 10/2014 | Hamel | .............. | G06F 17/30194 707/821 |
| 9,058,326 B1* | 6/2015 | Hamel | .............. | G06F 17/30008 |
| 2017/0222875 A1* | 8/2017 | Neria | .................. | H04L 41/0816 |

* cited by examiner

*Primary Examiner* — Arvin Eskandarnia
(74) *Attorney, Agent, or Firm* — Patterson & Sheridan, LLP

(57) ABSTRACT

Exemplary methods, apparatuses, and systems include a master node receiving, from a new node, a request indicating the new node is joining a cluster of nodes. The master node transmits, to the new node, an identifier of a delegate node within the cluster. The master node receives, from the delegate node, a request to maintain a synchronization point while the delegate node creates and transmits a snapshot of cluster metadata. The master node receives, from the new node, an indication that the new node is ready to join the cluster. Upon determining that the cluster has synchronized metadata following the synchronization point of the delegate node and prior to the ready indication, the master node transmits an acknowledgment to the new node to cause the new node to transition to an active state within the cluster.

20 Claims, 2 Drawing Sheets

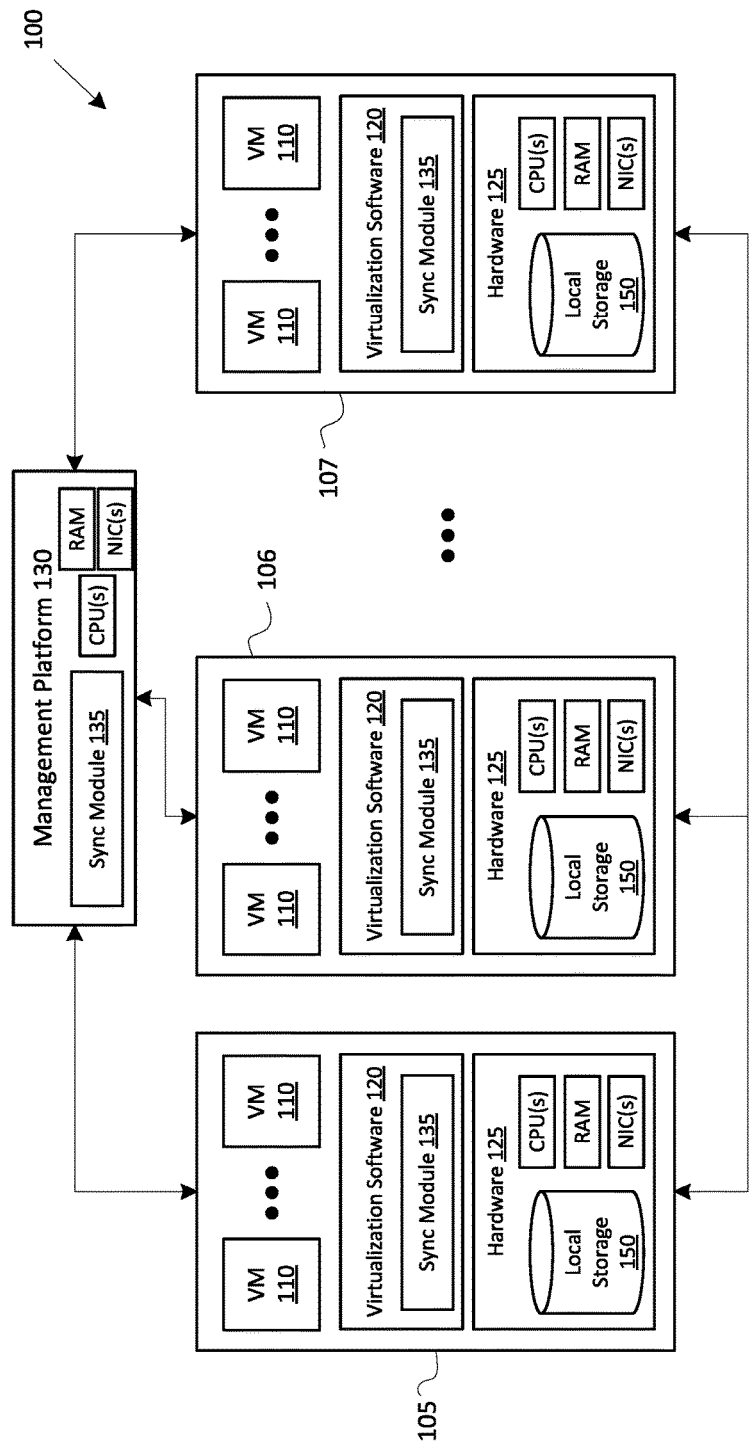

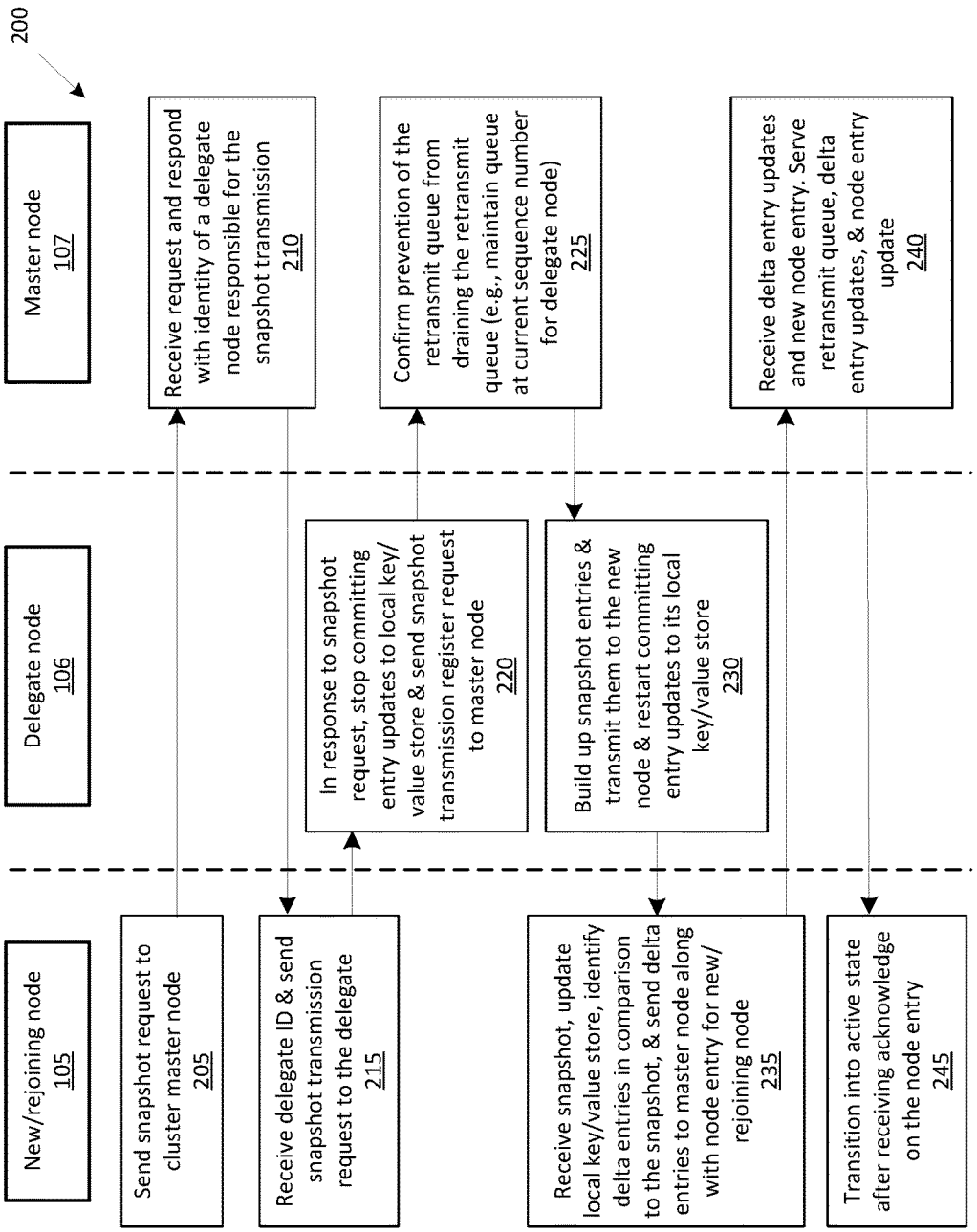

MAINTAINING PARTITION-TOLERANT DISTRIBUTED METADATA

FIELD OF THE INVENTION

The various embodiments described in this document relate to maintaining partition-tolerant distributed metadata. In particular, embodiments relate to managing a distributed system of key/value pairs when a node joins or rejoins a cluster of nodes across which key/value pairs are synchronized.

BACKGROUND OF THE INVENTION

In a complex computing environment, computing, memory, and storage resources represent and can be organized into levels of aggregation. For example, a node represents the aggregate computing, memory, and storage resources of a physical server. A cluster of nodes represents the aggregate computing, memory, and storage resources of a group of physical servers. The cluster can act and be managed as a single entity. In managing the cluster, the nodes synchronize metadata for the aggregated resources. For example, a cluster may utilize a synchronized, distributed key/value system to represent the capabilities of storage resources of each node or other storage metadata.

In a distributed key/value system with a master-slave architecture, the master node synchronizes metadata by transmitting the metadata to a new node when the new node joins the cluster. In a partition-tolerant distributed key/value system, one or more nodes can be removed from the cluster, e.g., due to a network partition. The partitioned node(s) continue to function normally and independently using the key/value system. As a result, a partitioned node might have additional key/value entries that the cluster does not have and vice versa. After the network partition is resolved, the node that was partitioned rejoins the cluster. The act of rejoining the cluster creates a need for the master node to reconcile and synchronize key/value pairs between the rejoining nodes and the existing cluster of nodes. If performed solely by the master node, this reconciliation and synchronization can create a bottleneck for the system.

BRIEF DESCRIPTION OF THE DRAWINGS

The present embodiments are illustrated by way of example and not limitation in the figures of the accompanying drawings, in which like references indicate similar elements, and in which:

FIG. 1 illustrates, in block diagram form, one or more networked processing devices within a distributed virtual storage area network maintaining partition-tolerant distributed metadata; and FIG. 2 is a flow chart illustrating an exemplary method of maintaining partition-tolerant distributed metadata.

DETAILED DESCRIPTION

This document describes embodiments that maintain partition-tolerant distributed metadata, such as a key/value system synchronized across a cluster of nodes. In particular, embodiments include a master node receiving, from a new node, a request indicating the new node is joining a cluster of nodes. The new node may have previously been a part of the cluster and is now rejoining the cluster. In response to the request from the new node, the master node selects and identifies an active, delegate node within the cluster to transmit a snapshot of its local key/value store to the new node. For example, the master node selects a delegate using a round robin or other load balancing algorithm. The new node updates its local key/value store using the snapshot from the delegate node and notifies the master node of any key/value metadata owned by the new node that is to be synchronized with the cluster. As a result, the cluster of nodes distributes the load of synchronizing new nodes among delegate nodes, decreasing the potential for a performance bottleneck at the master node. Additionally, the synchronization enables an efficient method for merging any key/value metadata owned by the new node with existing key/value metadata within the cluster.

FIG. 1 illustrates, in block diagram form, exemplary computing environment 100, including one or more networked processing devices maintaining partition-tolerant distributed metadata. Nodes 105-107 may also be referred to within this document as hosts, computers, and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). In one embodiment, one or more VMs 110 implement a virtualized compute, networking, storage, or security service (e.g., a firewall, webserver, database server, etc.).

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105-107 and management platform 130, via a wired or wireless network, with one another.

Virtualization software layer 120 runs on hardware 125 of host server or node (e.g., a physical computer). Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within storage 150 that may be accessed by VMs 110 residing in one or more nodes 105-107.

Management platform 130 is associated with nodes 105-107. Management platform 130 enables an administrator to manage the configuration of computing environment 100. In one embodiment, management platform 130 provides a management console for manual and automated monitoring and control of nodes 105-107, VMs 110, and hardware 125. For example, management platform 130 may provision, configure, and maintain VMs 110 as virtual desktops or network services, manage pools of computer resources to run VMs 110, etc. In one embodiment, an administrator sets and/or defines nodes included in a cluster using management platform 130. In one embodiment, management platform 130 includes CPU(s), RAM, and NIC(s) similar to hardware 125 described with reference to nodes 105-107. In an alternate embodiment, management platform 130 runs within a node, e.g., within a VM 110.

In one embodiment, computing environment 100 includes software-based "virtual storage area network" (VSAN) that leverages local storage 150 housed in or directly attached to host servers or nodes 105-107 (as used in this document, the term "housed" or "housed in" may be used to encompass both housed in or otherwise directly attached storage). Local storage 150 housed in or otherwise directly attached to the nodes may include combinations of solid state drives (SSDs) and/or magnetic or spinning disks (MDs). VSAN 115 provides an aggregate block object store to VMs 110 running on a cluster of nodes.

Each of management platform 130 and virtualization software 120 is illustrated as including sync module 135. In one embodiment, a master sync module 135 within one of nodes 105-107 manages synchronization of metadata between secondary clustering modules 135 in each of the other nodes 105-107. For example, each sync module 135 stores a local copy of key/value metadata within local storage 150. The key/value metadata may be descriptive of storage 150 within the cluster of nodes or another aggregated resource. The master sync module 135 receives updates to the key/vale metadata and broadcasts the updates to the cluster. Each secondary sync module 135 commits the updates to its local copy of the key/value metadata. In another embodiment, master sync module 135 is implemented within management platform 130. The synchronization of metadata by sync modules 135 is described with reference to FIG. 2.

FIG. 2 is a flow chart illustrating exemplary method 200 of maintaining partition-tolerant distributed metadata. At block 205, new node 105 transitions into a cluster joining state. In the cluster joining state, sync module 135 of new node 105 transmits a snapshot request, or other indication new node 105 is joining a cluster of nodes, to sync module 135 of master node 107 for the cluster. In one embodiment, new node 105 transitions into the cluster joining state in response to new node 105 detecting the resolution of a partition that previously removed new node 105 from the cluster. In another embodiment, new node 105 joins the cluster in response to receiving configuration instructions to join the cluster, e.g., from management platform 130.

At block 210, master node 107 receives the snapshot request from new node 105. In response to the request, sync module 135 of master node 107 selects delegate node 106 to be responsible for creating a snapshot of the cluster key/value metadata and transmitting the snapshot to new node 105. For example, sync module 135 of master node 107 may select delegate node 106 among active nodes within the cluster using a round-robin or other load balancing algorithm. In one embodiment, master node 107 transmits an identifier of delegate node 106 to new node 105 to enable new node 105 to request and receive the snapshot. In another embodiment, master node 107 transmits a notification to delegate node 106 indicating that delegate node 106 was selected to create the snapshot and transmit the snapshot to new node 105.

At block 215, new node 105 receives the identifier of delegate node 106. In response to the identification of delegate node 106, sync module 135 of new node 105 transmits a snapshot transmission request to delegate node 106.

At block 220, delegate node 106 receives the snapshot transmission request from new node 105. Alternatively, as described with reference to block 210 and bypassing block 215, delegate node 106 receives notification or snapshot transmission request from master node 107. In response to the snapshot transmission request, sync module 135 of delegate node 106 stops committing metadata entry updates to its local key/value store and identifies a sequence number of the last committed metadata entry update. For example, master node 107 transmits a sequence number along with each metadata entry update. Sync module 135 of delegate node 106 transmits a request to master node 107 to maintain a synchronization point while delegate node 106 creates and transmits the snapshot. For example, delegate node 106 transmits the identified sequence number of the last metadata entry update delegate node 106 committed to its local key/value store.

At block 225, sync module 135 of master node 107 receives and processes the request to maintain the synchronization point. For example, sync module 135 of master node 107 receives the sequence number and treats it as a simulated acknowledgement from new node 105 of the metadata update corresponding to that sequence number. Sync module 135 of node 107 stores the simulated acknowledgement or another indication that the retransmission queue managed by master node 107 cannot delete subsequent metadata update entries that have not been committed by new node 105 until the snapshot procedure is finished. Sync module 135 of master node 107 transmits an acknowledgement or other confirmation of maintaining the synchronization point to delegate node 106.

At block 230, sync module 135 of delegate node 106 creates a snapshot of the metadata entries in the local key/value store of delegate node 106. In one embodiment, sync module 135 of delegate node 106 creates the snapshot in response to receiving the acknowledgement or other confirmation of maintaining the synchronization point from master node 107. Sync module 135 of delegate node 106 then transmits the snapshot to new node 105. Once the snapshot has been transmitted, sync module 135 of delegate node 106 resumes committing metadata entry updates to its local key/value store. While sync module 135 of delegate node 106 may acknowledge metadata entry updates with sequence numbers subsequent to the synchronization point, master node 107 will continue to prevent the retransmission queue from draining until it receives acknowledgements from all other nodes in the cluster, including new node 105.

At block 235, sync module 135 of new node 105 receives the snapshot from delegate node 106. Sync module 135 of new node 105 compares metadata entries in the snapshot to any metadata entries in its local key/value store. Sync module 135 of new node 105 updates its local key/value store with metadata entries from the snapshot not previously stored in its local key/value store. Sync module 135 of new node 105 identifies delta metadata entries owned by new node 105 and not included in the snapshot. Additionally, sync module 135 of new node 105 identifies delta metadata entries owned by new node 105 and included in the snapshot but in need of updating. For example, new node 105 may have previously been a part of the cluster and the cluster might still have some old entries published by new node 105 before new node 105 was removed from the cluster. These "unhealthy" entries may have been deleted or updated by new node 105 after removal from the cluster and before new node 105 rejoins the cluster.

Sync module 135 of new node 105 transmits the identified delta metadata entries to master node 107 for addition, deletion, or updating within the cluster. Additionally, sync module 135 of new node 105 transmits node entry update or another unique identifier for new node 105 to master node 107 indicating that new node 105 has updated its local key/value store using the snapshot and new node 105 is ready to become an active node in the cluster.

In one embodiment, new node 105 stores metadata entries that it does not own and are not a part of the snapshot. For example, new node 105 may have previously been a part of a different cluster and stored metadata entries owned by nodes within that cluster. New node 105 does not need to update the cluster it is joining with metadata entries from another cluster that it does not own. Sync module 135 of new node 105 omits these delta metadata entries that are not owned by new node 105.

At block 240, sync module 135 of master node 107 receives the delta metadata entries sent by new node 105. Sync module 135 of master node 107 serves these delta metadata entries as updates by broadcasting them to the cluster and maintaining them to the retransmission queue until all nodes have acknowledged them as updates. Similarly, sync module 135 of master node 107 receives the node entry update from new node 105 and serves the node entry update to the cluster as an acknowledgement that new node 105 is ready to become an active node in the cluster.

At block 245, new node 105 receives the broadcast from master node 107 including the node entry update. In response to this acknowledgement, new node 105 transitions into an active state. In one embodiment, while waiting for this acknowledgment, sync module 135 of new node 105 receives metadata entry updates served by master node 107 (i.e., those following the synchronization point), merges those updates with its local key/value store, and transmits acknowledgements of the updates to master node 107.

While method 200 is described with reference to key/value pairs, method 200 may be carried out with other synchronized cluster metadata. It will be apparent from this description that aspects of the inventions may be embodied, at least in part, in software. That is, computer-implemented method 200 may be carried out in one or more computer systems or other data processing systems, such as nodes 105-107 and management platform 130, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node and/or management platform. It will also be appreciated that additional components, not shown, may also be part of nodes 105-107 and/or management platform 130, and, in certain embodiments, fewer components than that shown in FIG. 1 may also be used in nodes 105-107 and/or management platform 130.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to nodes and VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention (s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
    receiving, from a new node, a request indicating the new node is joining a cluster of nodes;
    transmitting, to the new node in response to the request, an identifier of a delegate node within the cluster;
    receiving, from the delegate node, a request to maintain a synchronization point of the delegate node while the delegate node creates a snapshot of cluster metadata and transmits the snapshot to the new node;
    receiving, from the new node, an indication that the new node has received the snapshot and is ready to join the cluster;
    determining that the cluster has synchronized metadata distributed within the cluster following the synchronization point of the delegate node and prior to receiving the indication that the new node is ready to join the cluster; and
    in response to the determination, transmitting an acknowledgment of the indication that the new node is ready to join the cluster and to cause the new node to transition to an active state within the cluster.

2. The computer-implemented method of claim 1, wherein the request indicating the new node is joining the cluster of nodes is a request for a snapshot of metadata synchronized within the cluster.

3. The computer-implemented method of claim 1, wherein the metadata is a plurality of key/value pairs of metadata for storage within the cluster.

4. The computer-implemented method of claim 1, further comprising:
    selecting the delegate node by applying a round robin selection algorithm to active nodes within the cluster.

5. The computer-implemented method of claim 1, further comprising:
    receiving, from the new node, metadata entries the new node determined were not included in the snapshot and stored by the new node prior to the new node transmitting the request indicating the new node is joining the cluster; and
    broadcasting, to the cluster, the metadata entries received from the new node, wherein determining that the cluster has synchronized metadata distributed within the cluster includes determining that the metadata entries received from the new node have been synchronized across the cluster.

6. The computer-implemented method of claim 1, wherein the new node was previously a part of the cluster and is rejoining the cluster.

7. The computer-implemented method of claim 1, wherein the synchronization point of the delegate node is a sequence number of a last metadata entry received by the delegate node, the sequence number indicating not to drain a retransmission queue of metadata entries corresponding to subsequent sequence numbers until the new node acknowledges the metadata entries corresponding to subsequent sequence numbers.

8. The computer-implemented method of claim 1, wherein receiving the indication that the new node is ready to join the cluster includes receiving a key/value pair including a unique identifier for the new node.

9. A non-transitory computer-readable medium storing instructions, which when executed by a processing device, cause the processing device to perform a method comprising:
    receiving, from a new node, a request indicating the new node is joining a cluster of nodes;
    transmitting, to the new node in response to the request, an identifier of a delegate node within the cluster;
    receiving, from the delegate node, a request to maintain a synchronization point of the delegate node while the delegate node creates a snapshot of cluster metadata and transmits the snapshot to the new node;
    receiving, from the new node, an indication that the new node has received the snapshot and is ready to join the cluster;
    determining that the cluster has synchronized metadata distributed within the cluster following the synchronization point of the delegate node and prior to receiving the indication that the new node is ready to join the cluster; and
    in response to the determination, transmitting an acknowledgment of the indication that the new node is ready to join the cluster and to cause the new node to transition to an active state within the cluster.

10. The non-transitory computer-readable medium of claim 9, wherein the request indicating the new node is joining the cluster of nodes is a request for a snapshot of metadata synchronized within the cluster.

11. The non-transitory computer-readable medium of claim 9, wherein the metadata is a plurality of key/value pairs of metadata for storage within the cluster.

12. The non-transitory computer-readable medium of claim 9, the method further comprising:
    selecting the delegate node by applying a round robin selection algorithm to active nodes within the cluster.

13. The non-transitory computer-readable medium of claim 9, the method further comprising:
    receiving, from the new node, metadata entries the new node determined were not included in the snapshot and stored by the new node prior to the new node transmitting the request indicating the new node is joining the cluster; and
    broadcasting, to the cluster, the metadata entries received from the new node, wherein determining that the cluster has synchronized metadata distributed within the cluster includes determining that the metadata entries received from the new node have been synchronized across the cluster.

14. The non-transitory computer-readable medium of claim 9, wherein the new node was previously a part of the cluster and is rejoining the cluster.

15. The non-transitory computer-readable medium of claim 9, wherein the synchronization point of the delegate node is a sequence number of a last metadata entry received by the delegate node, the sequence number indicating not to drain a retransmission queue of metadata entries corresponding to subsequent sequence numbers until the new node acknowledges the metadata entries corresponding to subsequent sequence numbers.

16. The non-transitory computer-readable medium of claim 9, wherein receiving the indication that the new node is ready to join the cluster includes receiving a key/value pair including a unique identifier for the new node.

17. A master node comprising:
  a processing device; and
  a memory coupled to the processing device, the memory storing instructions which, when executed by the processing device, cause the master node to:
    receive, from a new node, a request indicating the new node is joining a cluster of nodes;
    transmit, to the new node in response to the request, an identifier of a delegate node within the cluster;
    receive, from the delegate node, a request to maintain a synchronization point of the delegate node while the delegate node creates a snapshot of cluster metadata and transmits the snapshot to the new node;
    receive, from the new node, an indication that the new node has received the snapshot and is ready to join the cluster;
    determine that the cluster has synchronized metadata distributed within the cluster following the synchronization point of the delegate node and prior to receiving the indication that the new node is ready to join the cluster; and
    in response to the determination, transmit an acknowledgment of the indication that the new node is ready to join the cluster and cause the new node to transition to an active state within the cluster.

18. The master node of claim 17, wherein the request indicating the new node is joining the cluster of nodes is a request for a snapshot of metadata synchronized within the cluster.

19. The master node of claim 17, wherein the metadata is a plurality of key/value pairs of metadata for storage within the cluster.

20. The master node of claim 17, wherein the instructions further cause the master node to:
  receive, from the new node, metadata entries the new node determined were not included in the snapshot and stored by the new node prior to the new node transmitting the request indicating the new node is joining the cluster; and
  broadcast, to the cluster, the metadata entries received from the new node, wherein determining that the cluster has synchronized metadata distributed within the cluster includes determining that the metadata entries received from the new node have been synchronized across the cluster.

* * * * *